US006776721B2

United States Patent
Perrow

(12) United States Patent
(45) Date of Patent: Aug. 17, 2004
(10) Patent No.: US 6,776,721 B2

(54) TRIPOT JOINT

(75) Inventor: Scott Jay Perrow, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/283,811

(22) Filed: Oct. 30, 2002

(65) Prior Publication Data
US 2004/0087380 A1 May 6, 2004

(51) Int. Cl.[7] .............................................. F16D 3/205

(52) U.S. Cl. ........................ 464/111; 464/130; 464/905

(58) Field of Search ................................. 464/111, 124, 464/130, 905; 384/561, 570, 903

(56) References Cited

U.S. PATENT DOCUMENTS

| | | | | |
|---|---|---|---|---|
| 5,237,748 A | * | 8/1993 | Glinski | 384/561 X |
| 5,658,199 A | * | 8/1997 | Ricks et al. | 464/111 |
| 6,375,576 B1 | * | 4/2002 | Margerie | 464/111 |
| 6,632,143 B2 | * | 10/2003 | Sugiyama et al. | 464/111 |

FOREIGN PATENT DOCUMENTS

GB            878329    *  9/1961  ................. 384/560

* cited by examiner

Primary Examiner—Greg Binda
(74) Attorney, Agent, or Firm—Michael D. Smith

(57) ABSTRACT

A tripot joint (10) includes a tripot housing (12) having three guide channels (24) receiving three corresponding trunnions (20) of a tripot spider (16). A ball assembly (28) is mounted on each of the trunnions (20) and received in the guide channels (24). The ball assembly includes an inner ball (30), and outer ball (40), and a complement of roller elements (52). The inner balls (30) are slidable axially on the roller elements (52) relative to the outer balls (40). Each ball assembly (28) includes at least one yieldable retainer (58) mounted on the outer ball (40) and projecting into the axial sliding path of the inner ball (30) in at least partial overlapping relation to the inner ball (30). The yieldable retainers secure the inner and outer balls (30, 40) against axial separation prior to joining the ball assemblies (28) with the trunnions (20) and guide channels (24). During operation of the joint (10), the yieldable retainers (58) are displaced out of the axial sliding path through normal axial forces exerted by the inner ball against the retainers (58), allowing for full functional axial sliding movement of the inner balls (30) relative to the outer balls (40) during transmission of torque through an angle of the joint (10).

28 Claims, 2 Drawing Sheets

TRIPOT JOINT

TECHNICAL FIELD

This invention relates generally to tripot joints.

BACKGROUND OF THE INVENTION

Typical tripot joints include a tripot housing that is fixed at one end to a shaft and open at its opposite end to receive a tripot spider into the housing which is fixed to another shaft. The spider has three trunnions which project radially outwardly into three respective longitudinal guide channels of the housing. Each trunnion carries a ball assembly which rollably guides the trunnions along the channels. This type of joint enables torque to be transmitted between the shafts at an angle and further enables a certain amount of axial plunging movement of the spider within the housing during operation of the joint to accommodate adjustment in the effective length of the shafts. A typical application for such joints is in front wheel drive applications for automotive vehicles, where the joint forms part of a shaft assembly operative to transmit torque from the transmission to the front drive wheels, while allowing for effective changes in the axial length of the shaft assembly through plunging of the tripot joint to accommodate up and down movements of the drive wheels.

The complex motion of such tripot joints make them susceptible to noise, shudder, and/or chattering. The shaft angle and rotation of the joint during the transmission of torque, coupled with axial plunging of the spider within the housing, presents a challenge to design such joints so that the ball assemblies to run true in the guide channels of the housing, attributing at least in part to the noise, chatter and/or shudder problems.

One particular type of tripot joint shown to perform exceptionally well is manufactured by the assignee of the present invention. It employs a multi-part ball assembly on each trunnion that includes an inner ball formed with a part-spherical inner concave surface that mates with a part-spherical convex surface of the respective trunnions and supports an outer roller or ball on a complement of needle rollers which support the outer ball for rotation relative to the inner ball, and enable the inner ball, and thus the trunnions, to shift or slide axially of the outer ball when transmitting torque through the joint at an angle in order to maintain the outer balls riding in their respective guide channels of the housing.

Typically, the outer ball has bearing retainers adjacent its axial ends which serve to capture the bearings in the axial direction. The retainers stop short of extending into the path of the inner ball in order that the inner ball is able to slide axially beyond the ends of the rollers. Thus, there is nothing retaining the inner ball against axial separation from the outer ball before the ball assemblies are mounted on the trunnions and disposed within the guide channels of the housing. As such, the ball assemblies are subject to inadvertent disassembly and must be carefully handled during the manufacture and service of the tripot joint or else the ball assembly can fall apart under its own weight. Once the inner ball is separated from the outer ball, the complement of needle rollers are prone to falling inwardly and becoming separated from the outer ball, further adding to the handling difficulties.

It is an object of the present invention to eliminate or greatly minimize the foregoing limitations of prior tripot joints while maintaining their high performance.

SUMMARY OF THE INVENTION AND ADVANTAGES

A tripot joint assembly constructed according to the present invention includes a tripot housing coupled to a first shaft and having three axially extending ball channels, and a tripot spider coupled to a second shaft and having three radially outwardly extending trunions which are disposed in the guide channels and each presenting a convexly curved outer surface. A ball assembly is disposed on each trunion and includes an inner ball having an inner concavely curved surface mating with the convexly curved surface of each trunion to establish a rotatable and angular support of each inner ball on its respective trunion. The ball assemblies each include an outer ball having a convexly curved outer surface rollably engaging the guide channels of the housing and an inner surface spaced radially from an outer surface of the inner ball. Each ball assembly further includes a complement of roller elements disposed between the inner and outer balls and providing rolling support of the outer balls on the inner balls, and axial sliding support of the inner balls on the outer balls. According to the invention, at least one yieldable retainer is mounted on each outer ball and projects radially inwardly into the axial sliding paths of the inner balls in at least partial overlapping relation to the inner balls. The retainers present yieldable impediments along the axial sliding paths that are operative to yield out of the axial sliding paths during operation of the joint in response to application of an axial sliding force on the retainers exceeding a pre-determined yield force of the retainers to permit axial movement of the inner balls along the outer balls beyond the retainers. The retainers are further operative to restrain the outer balls against axial separation from the inner balls prior to disposing the ball assemblies within the guide channels.

The invention has the advantage of simplifying the manufacture and assembly of tripot joint assemblies, particularly with respect to the ball assemblies.

The ball assemblies, fitted with the yieldable retainers, enable the ball assemblies to be pre-manufactured and assembled as self-contained ball modules that remain assembled prior to being united with the trunnions and ball guides.

The invention has the further advantage of providing a yieldable retainer that, when the ball assemblies are mounted on the trunnions and disposed in the ball guides, yield out of the way during normal joint operation to permit the inner ball to slide axially relative to the outer ball beyond the retainers. As such, the invention provides the advantageous assembly benefits without impairing the operation of the joint.

The invention has the further advantage of providing the subject yieldable retention of the inner ball without having to increase the radial size of the joint, which would be necessary if rigid, non-yieldable retainers were employed in overlapping relation to the inner ball, but with sufficient clearance to accommodate full axial sliding travel of the inner ball relative to the outer ball during normal operation of the joint. The yieldable retainer, extended into the axial path, is effective to capture the inner ball prior to assembly, yet yields out of the way during normal operation to accommodate full axial travel of the inner ball relative to the outer ball in a relatively smaller package size.

The invention has the further advantage of being readily adaptable to existing and new tripot product applications.

According to a further aspect of the invention, the yieldable retainer is one that is elastically deformable such that the retainer returns to the axial sliding path once the inner ball slides axially inwardly of a retainer. Such restoration of the yieldable retainer facilitates servicing of the tripot joint by maintaining axial retention of the inner ball relative to the outer ball as a self-supporting ball module upon removal of the ball assemblies from the ball channels and trunnions.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
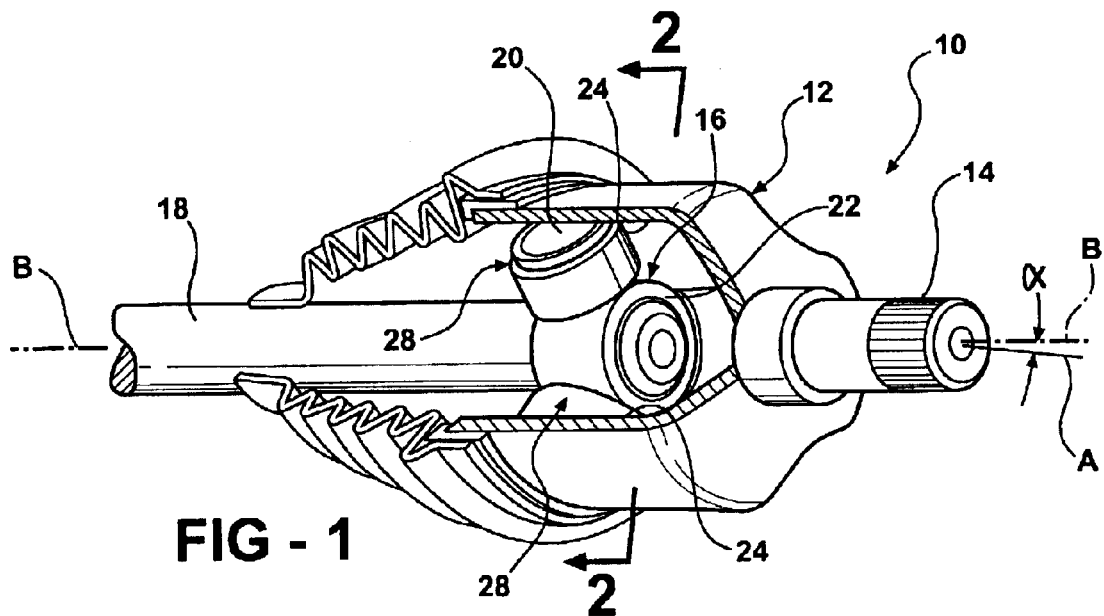
FIG. 1 is a perspective elevation view of a tripot joint constructed according to the present invention.

A tripot joint constructed according to a presently preferred embodiment of the invention is illustrated generally at 10 in the drawings and comprises a tripot housing 12 having a generally tubular construction coupled at one end to a first shaft 14 and having an opposite open end for receiving a spider 16 into the housing 12 which is coupled to a second shaft 18. The spider 16 includes three trunnions 20 extending radially outwardly from a trunnion body 22 coupled to the shaft 18. The trunnions 20 are disposed in three complementing guide channels 24 formed on the interior of the housing 12. Each trunnion 20 has an outer convexly curved surface 26 that is preferably part-spherical in shape.

Figure 4:
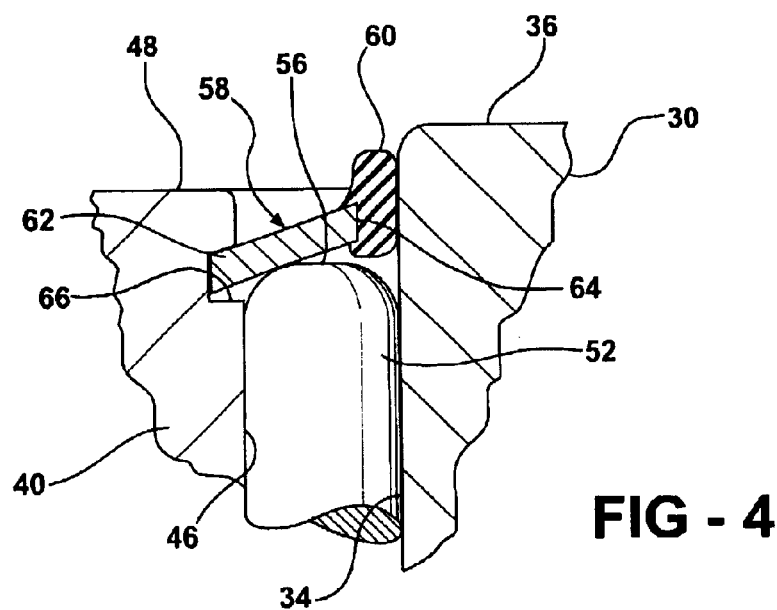
FIG. 4 is an enlarged fragmentary sectional view of the ball assembly of FIG. 3.
Figure 2:
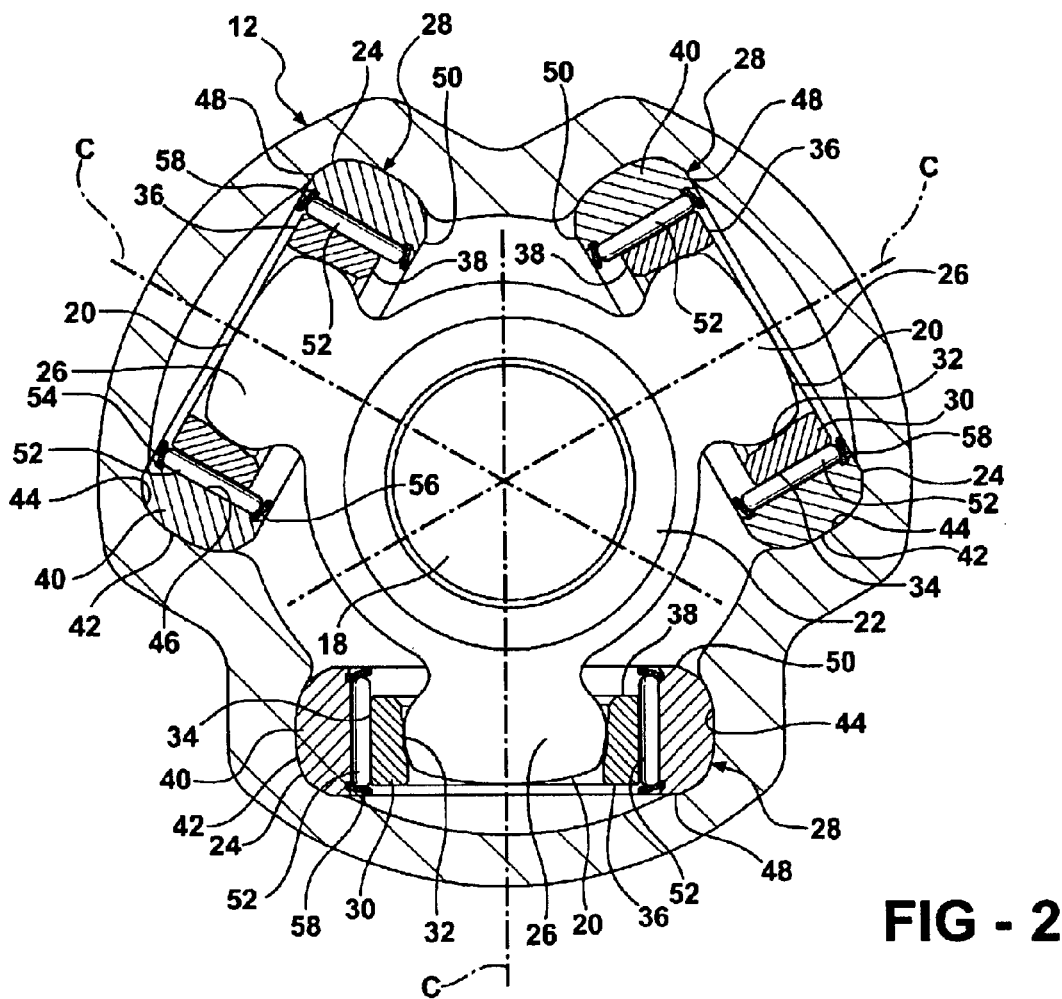
FIG. 2 is a cross-sectional view taken generally along lines 2—2 of FIG. 1.
Figure 3:
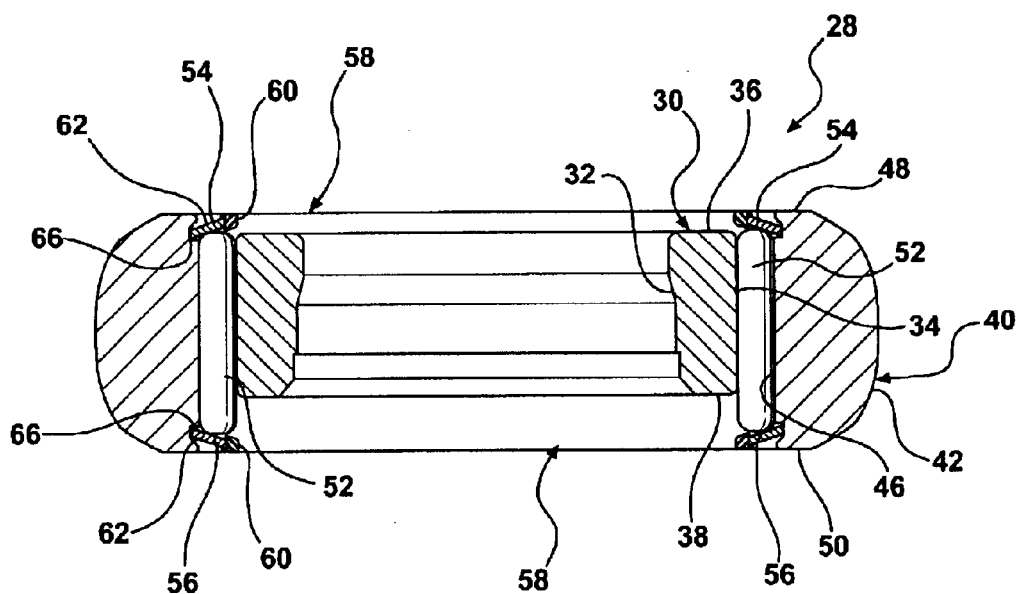
FIG. 3 is an enlarged cross-sectional view of a ball assembly of FIGS. 1 and 2.

A multi-part ball assembly 28 is disposed on each trunnion 20 within the respective guide channels 24, as shown in FIG. 2. Referring additionally to FIGS. 3 and 4, each ball assembly 28 includes an inner ball 30 which has a generally ring-like structure formed with a concavely curved inner surface 32 which nests with the outer surface 26 of the trunnions 20 to provide angular and rotatable support of the inner balls 30 on the trunnions 20. The mating surfaces 26, 32 also secure the inner ball 30 axially on the trunnions 20 to prevent relative axial sliding movement of the inner ball 30 relative to the trunnions 20. The inner ball 30 has a generally cylindrical outer surface 34 that extends axially between opposite axial outer and inner ends 36, 38 of the inner ball 30.

The ball assembly 28 further includes an outer ball 40 which also has a ring-like structure and is formed with a convexly curved outer surface 42 which engages and rides along a convexly curved axially extending track 44 of the guide channels 24, as best shown in FIG. 2 during axial plunging of the joint 10. The mating surfaces 42, 44 of the outer ball 40 and guide channels 24 support the outer ball 40 against any considerable relative axial movement along the axis C of the respective trunnions 20. The outer ball 40 has a generally cylindrical inner surface 46 that faces, but is spaced radially from, the outer surface 34 of the inner ball 30. The inner surface 46 extends axially between outer and inner ends 48, 50 of the outer ball 40. As best shown in FIGS. 2 and 3, the outer ball 40 is axially larger than the inner ball 30 as measured between their respective ends 48, 50 and 36, 38. The inner and outer balls 30, 40 are concentrically arranged with respect to the axis C.

The ball assemblies 28 each include a complement or plurality of roller elements 52 in the preferred form of needle bearings disposed in the space between the inner and outer balls 30, 40. The roller elements rollably engage the respective outer 34 and inner 46 surfaces of the inner and outer balls 30, 40 and provide rolling support of the outer ball 40 relative to the inner ball 30 about the axis C, as well as axial sliding support of the inner ball 30 relative to the outer ball 40 in the direction of the axis C. The roller elements 52 have outer and inner ends 54, 56 and an axial length between the ends 54, 56 greater than that of the axial length of the inner ball 30 between its ends 32, 34. The roller elements 52 thus support the inner balls 30 for relative axial sliding movement along the roller elements 52 in the direction of the axis C of the trunnions 20 along and beyond the ends 54, 56 of the elements 52, to accommodate axial displacement of the inner ball 30 and thus the trunnions 20 relative to the outer ball 40. As well understood by those skilled in the art, during rotation of the shafts 14, 18 and transmission of torque through the joint 10 at an angle α between the respective axes A, B of the shafts 12, 18, the angled presentation of the trunnions 20 within the housing 12 due to the joint angle α between the shafts 14, 18 constantly changes the distance that the trunnions 20 project into the guide channels 24, thus requiring axial shifting or displacement of the inner balls 30 relative to the outer balls 40 which are axially fixed in their guide channels 24 along the trunnion axis C. This constant axial shifting is accommodated by the axial sliding support provided by the roller elements 52, and the length of the axial sliding path of the inner balls 30 will depend upon the joint angle and thus the particular application to which the joint 10 is applied.

Turning now to FIG. 3, the ball assemblies 28 are fitted with at least one and preferably a pair of retainers 58 which are mounted on the outer balls 40 adjacent at least one and preferably each of their ends 48, 50. The retainers 58 project radially inwardly toward the inner ball 30 and are provided with a yieldable end portion 60 which is disposed in the axial sliding path of the inner balls 30 and at least partially overlaps the ends 36, 38 of the inner balls 30. The yieldable retainer 60 presents a yieldable barrier to full axial sliding movement of the inner ball 30 relative to the outer ball 40. Prior to assembly, as best illustrated in FIG. 3, the retainers 58 serve to capture the inner ball 30 axially on the outer ball 40, preventing axial separation of the balls 30, 40 under their own gravitational weight or low axial forces experienced during handling and assembly with the trunnions and guide channels 24. In this way, the ball assemblies 28 provide a modular ball assembly which is self-contained against axial separation prior to assembly with the trunnions 20 and housing 12.

The yieldable end portion 60 of the retainers 58 preferably comprises an elastically deformable member, such as an annular ring or lip of plastics material (e.g., rubber, NBR, or the like) which deflects under a pre-determined axial load as illustrated in FIG. 4 to enable the inner ball 30 to slide axially past the retainer 60 during operation of the joint 10 in response to the application of an axial load exceeding the yield force of the retainer 60. While the yield force may vary from one application to another, it is generally great enough to prevent inadvertent axial separation of the inner and outer balls 30, 40 prior to assembly of the ball assembly 28 with the trunnions 20 and housing 1, but low enough where the yieldable retainers 60 do not interfere with normal sliding movements of the inner balls 30 during operation of the joint. For example, a retainer which provides about 2 ft-lbs resistance to axial separation of the balls 30, 40 would be sufficient to maintain the balls assembled prior to connection with the trunnions 20 and housing 12, while allowing the inner ball 30 to deform and slide easily past the retainer 60 during operation of the joint.

As shown best in FIGS. 3 and 4, the retainers 58 preferably comprise a rigid non-deflectable flange or ring portion 62 of metal which projects form the outer ball 40 over the ends 54, 56 of the roller elements 52 and terminates at a radial inner end 64 spaced from the outer surface 34 of the inner ball 30. The rigid ring portions 62 axially retain the roller elements 52 against separation from the outer ball 40 beyond its ends 48, 50. The yieldable end portion 60 is preferably molded to the inner end 64 of the rigid ring portion 62, presenting flexible extensions of the ring portion 62 that overlap the ends 36, 38 of the inner ball 30. The ring portion 62 may be formed as a separate structure form the outer balls 40 and be received in ring groove 66 adjacent the ends 48, 50 of the outer ball 40. Alternatively, the ring portion 62 could be formed as one piece with the outer ball 40 as end flange projections which extend over the ends 54, 56 of the roller elements 52, but terminate short of the inner ball 30, and onto which the yieldable end portions 60 are molded or otherwise secured.

It will be appreciated from FIG. 4 that the illustrated displacement of the inner ball 30 axially beyond the retainer 58 in one direction is equally applicable to such axial displacement in the opposite direction past the other end of the outer ball 40.

What is claimed is:

1. A tripot joint comprising:
   a tripot housing coupled to a first shaft and having three guide channels;
   a tripot spider coupled to a second shaft having three radially outwardly extending trunnions disposed in said guide channels and each presenting a convexly curved outer surface;
   a ball assembly disposed on each of said trunnions, each ball assembly including an inner ball having an inner concavely curved surface mating with said convexly curved surface of each of said trunnions to establish rotatable and angular support of each of said inner balls on their respective trunnions, an outer ball having a convexly curved outer surface rollably engaging said guide channels of said housing an inner surface spaced radially from an outer surface of said inner ball, and a complement of roller elements disposed between said inner and outer balls of each of said ball assemblies to provide rolling support of said outer balls on their respective said inner balls and axial sliding support of said inner balls on their respective outer balls along an axial sliding paths of said inner balls; and
   at least one yieldable retainer mounted on each of said outer balls and projecting radially inwardly into said axial sliding paths of said inner balls in at least partial overlapping relation to said inner balls, said retainers presenting yieldable impediments along said axial sliding paths that are operative to yield out of said axial sliding paths during operation of the joint in response to application of an axial force on said retainers exceeding a predetermined yield force of said retainers to permit axial movement of said inner balls along said outer balls beyond said retainers, and operative to capture and restrain said outer balls against axial separation from said inner balls prior to disposing said ball assemblies within said guide channels.

2. The joint of claim 1 wherein said yieldable retainers comprise elastically deformable members.

3. The joint of claim 2 wherein said elastically deformable members comprise generally annular lips of plastics material supported by said outer balls.

4. The joint of claim 1 wherein said yieldable retainers comprise rigid annular rings fixed axially in corresponding grooves of siad outer balls and extending radially inwardly of said outer balls to inner annular ends spaced radially from said innter balls, and an elastically flexible end extension mounted on said inner annular end of said each of said rings and fabricated of elastically flexible material overlapping said inner balls.

5. The joint of claim 4 wherein each ball assembly includes a pair of said yieldable retainers.

6. The joint of claim 4 wherein said annular rings overlap said rollers and secure said rollers from axial separation from said outer member beyond said annular rings.

7. The joint of claim 6 wherein said annular rings are fabricated of metal and aid yieldable end extensions are fabricated of plastics material and are molded onto said annular rings.

8. The joint of claim 1 wherein said yieldable retainers are operative to support said outer balls from separation form said inner balls when said innter balls are separated from said trunnions.

9. The assembly of claim 1 wherein outer balls are relatively longer than said inner balls in the axial direction of said trunnions.

10. A tripot joint assembly, comprising:
    an outer joint member having three ball channels extending axially of said outer joint member;
    an inner joint member including a spider having three radially outwardly extending trunnions disposed in said ball channels and a ball assembly carried on each of said trunnions, said ball assembly including an inner ball, an outer ball and a plurality of roller bearings disposed between said inner ball and said outer ball to enable rotation of said outer ball relative to said inner ball and relative axial displacement of said inner ball relative to said outer ball along a path of movement; and
    a retainer carried on said outer ball adjacent at least one end thereof and extending over said needle bearings to limit axial movement of said needle bearings beyond said retainer, including a yieldable end portion extending into said path of movement of said inner ball to limit axial movement of said inner ball relative to said outer ball beyond said yieldable end portion when, axial displacement forces acting on said inner ball are below a threshold value, and yielding in response to application of an axial displacement force exceeding said threshold valve to permit movement of said inner ball beyond said retainer.

11. The assembly of claim 10 wherein said yieldable end portion comprises a flexible lip.

12. The assembly of claim 10 wherein said retainer includes a rigid portion extending over said roller bearings and said yieldable end portion supported by said rigid portion.

13. The assembly of claim 12 wherein said yieldable portion is molded to said rigid portion.

14. The assembly of claim 10 said yieldable portion is resilient.

15. The assembly of claim 10 wherein said outer ball is axially longer than said inner ball.

16. The assembly of claim 15 wherein said outer ball includes a ring groove adjacent said at least one end of said outer ball and said retainer comprises a ring disposed in said groove.

17. The assembly of claim 16 wherein said ring has a rigid body portion extending over said roller bearings an spaced form said path of movement of said inner ball, and said yieldable portion carried by said rigid body portion.

18. The assembly of claim 16 wherein said ball assembly includes a pair of said retainers.

19. The assembly of claim 18 wherein said retainers are carried in opposite ends of said outer ball member.

20. The assembly of claim 10 wherein said trunnions have a convex outer surface.

21. The assembly of claim 20 wherein said inner balls have a concave inner surface.

22. The assembly of claim 21 wherein said roller bearings comprise needle bearings.

23. The assembly of claim 20 wherein said inner balls are supported against axial displacement relative to said trunnions.

24. A ball assembly for a tripot joint, comprising an inner ball having a concavely curved inner surface and a generally cylindrical outer surface;

an outer ball having a convexly curved outer surface and a generally cylindrical inner surface spaced radially from said outer surface of said inner ball;

a complement of roller elements disposed between said inner and outer balls and rollably engaging said inner and outer surfaces of said balls; and at least one yieldable retainer comprising a rigid ring mounted on said outer ball and an elastically yieldable end portion of non-metallic material extending in at least partially overlapping relation to said inner ball and deflectible out of the path of said inner ball in response to application of a predetermined yield force to enable said inner ball to move past said yieldable end portion.

25. The assembly of claim 24, including a pair of said yieldable retainers.

26. The assembly of claim 24 wherein said at least one yieldable retainer comprises a rigid ring having an elastically yieldable end portion.

27. The assembly of claim 24 wherein said end portion is molded onto said ring.

28. The assembly of claim 24 wherein said at least one yieldable retainer secures said outer ball against axial separation from said inner ball under the gravitational weight of said outer ball.

* * * * *